(12) United States Patent
Nakai et al.

(10) Patent No.: US 6,751,908 B2
(45) Date of Patent: Jun. 22, 2004

(54) WEATHER STRIP FOR A SLIDING TYPE REAR DOOR

(75) Inventors: Hirofumi Nakai, Hiroshima-ken (JP); Yoshio Fujimura, Hiroshima-ken (JP); Yukihisa Matsuda, Toyota (JP); Susumu Otsuka, Toyota (JP); Yoshio Itou, Yokosuka (JP)

(73) Assignees: Nishikawa Rubber Co. Ltd., Hiroshima-ken (JP); Kanto Auto Works, Ltd., Kanagawa-ken (JP)

( * ) Notice: Subject to any disclaimer, the term of this patent is extended or adjusted under 35 U.S.C. 154(b) by 0 days.

(21) Appl. No.: 10/387,639

(22) Filed: Mar. 13, 2003

(65) Prior Publication Data

US 2003/0177700 A1 Sep. 25, 2003

(30) Foreign Application Priority Data

Mar. 19, 2002 (JP) ........................................ 2002-075700

(51) Int. Cl.[7] .............................................. E06B 7/16
(52) U.S. Cl. ...................................... 49/475.1; 49/479.1
(58) Field of Search ............................ 49/475.1, 495.1, 49/479.1, 498.1

(56) References Cited

U.S. PATENT DOCUMENTS 4,492,405 A    1/1985  Chikaraishi et al.
4,979,333 A  * 12/1990  Goto et al. ................. 49/479.1
5,566,510 A  * 10/1996  Hollingshead et al. ...... 49/479.1
5,639,533 A  *  6/1997  Yamashita ................. 49/475.1

FOREIGN PATENT DOCUMENTS

GB        1424942     2/1976
JP       58110335     6/1983

* cited by examiner

*Primary Examiner*—Jerry Redman
(74) *Attorney, Agent, or Firm*—Flynn, Thiel, Boutell & Tanis, P.C.

(57) ABSTRACT

A weather strip for a sliding type rear door is applied to a car which is unfurnished with a center pillar, and is furnished with a front door turnable about hinges provided at the front end thereof and with a sliding rear door which slides back and forth. The weather strip is attached to the front end of the rear door and includes a tapered lip portion extending toward the front door. The tapered lip portion is formed on a molded portion of the weather strip formed at the upper end portion thereof. The tapered portion elastically contacts an opening seal attached to a roof side of a car body and a weather strip attached to a rear end of the front door when the rear door is closed. A guide portion is formed at the lower half of the lip portion. The guide portion is thicker than the lip portion, and it contacts the opening seal and the front door weather strip immediately before the tip end of the tapered lip portion contacts the opening seal and the front door weather strip. Thus, the tip end of the lip portion is prevented from being reversed or curled up when the rear door is closed.

7 Claims, 4 Drawing Sheets

WEATHER STRIP FOR A SLIDING TYPE REAR DOOR

FIELD OF THE INVENTION

The invention relates to a weather strip attached to a front end of a rear door of a car which is unfurnished with a center pillar. The front door of the car is turnable about hinges provided at the front end thereof, and the rear door of the car slides back and forth.

BACKGROUND OF THE INVENTION

A conventional weather strip is described with reference to FIGS. 1 to 4. There has been a conventional car having no center pillars, having a pair of front doors 2 turnable about hinges provided at the front end thereof, and having a pair of rear doors capable of sliding back and forth. In this conventional car, a tapered lip portion 22 is formed on a molded portion 21 of a weather strip of the rear door 1 at the upper end thereof extending towards the front door 2.

The lip portion 22 secures a sealing performance between the front door 2, the rear door 1 and a roof side 4 as a tip portion 22a of the lip portion 22 enters between an opening seal 3 provided along the roof side 4 of a car body and the front door 2 when the rear door 1 is closed.

There is provided a water receiver 23 on the molded portion 21 immediately below the lip portion 22 facing the opening seal 3. The water receiver 23 catches water e.g. rainwater. The water passes a water drawing port 18 formed on the molded portion 21 of the weather strip 20 and drains through the hollow portion formed in an extrusion molded portion 15 uniformed with the molded portion 21 below the molded portion 21.

According to the conventional weather strip, since the lip portion 22 is tapered, when the rear door 1 is closed while the front door 2 is closed beforehand, the thin tip end 22a of the lip portion 22 is forced to slide on the opening seal 3 and a weather strip 16 for the front door 2. Therefore, the tip end 22a of the lip portion 22 tends to reverse its posture by the repulsive force generated there. Accordingly, there is formed a gap G between the opening seal 3 and the front door weather strip 16, decresing a sealing performance of that portion (see FIG. 4).

To solve this problem, the tip end 22a of the lip portion 22 may be formed thicker, thereby preventing the tip end 22a from being reversed or curled up. However, if the tip end 22a is made thicker, there will be formed a gap at the front and back sides of the thick tip end, although the thick tip end would not reverse. Thus, the sealing performance will not improve with this means.

SUMMARY OF THE INVENTION

The invention has been developed to solve the problem in the conventional weather strip as set forth above, and it is an object of the invention to provide a weather strip for a sliding type rear door in which a lip portion does not reverse its posture or curl up when the rear door is closed.

To achieve the above object, the weather strip 10 for a sliding type rear door according to a first aspect of the invention is applied to a car which is unfurnished with a center pillar, and is furnished with a front door 2 turnable about hinges provided at the front end thereof and with a sliding rear door which slides back and forth. The weather strip is attached to the front end of the rear door 1 and includes a tapered lip portion 12 extending toward the front door 2. The tapered lip portion 12 is formed on a molded portion 11 of the weather strip formed at the upper end portion thereof. The tapered portion 12 elastically contacts an opening seal 3 attached to a roof side 4 of a car body and a weather strip 16 attached to a rear end of the front door 2 when the rear door 1 is closed. A guide portion 14 is formed at the lower half of the lip portion 12. The guide portion 13 is thicker than the lip portion 12, and it contacts the opening seal 3 and the front door weather strip 16 immediately before the tip end 12a of the tapered lip portion 12 contacts the opening seal 3 and the front door weather strip 16.

The weather strip according to the second aspect of the invention is characterized in that the guide portion 14 comprises a tapered base portion 14a and an expansion portion 14b provided at the front end of the base portion 14a. The expansion portion 14b comprises a shape of a semicircular in cross section.

PREFERRED EMBODIMENT OF THE INVENTION

Figure 1:
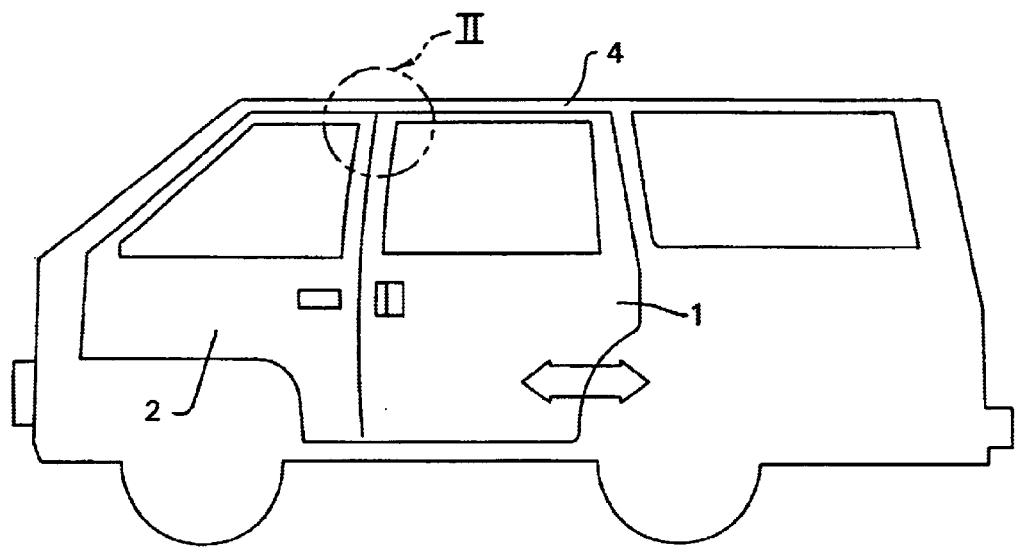
FIG. 1 is a side view of a car having a sliding type rear door.
Figure 2:
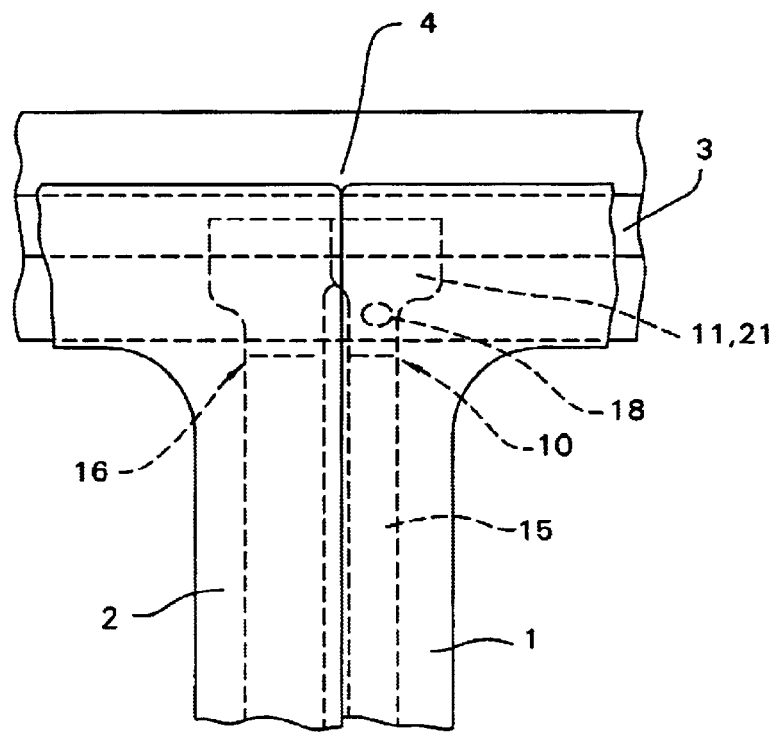
FIG. 2 is a schematic side view of an encircled part II in FIG. 1.
Figure 3:
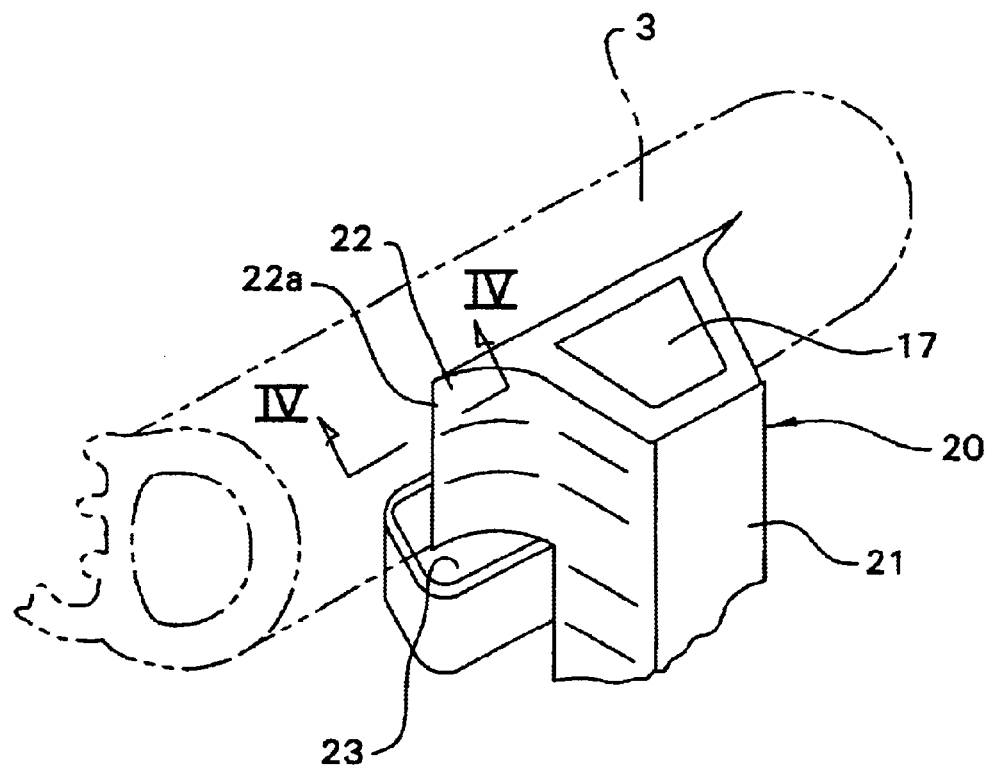
FIG. 3 is a perspective view showing a main portion of a conventional weather strip for a rear door.
Figure 4:
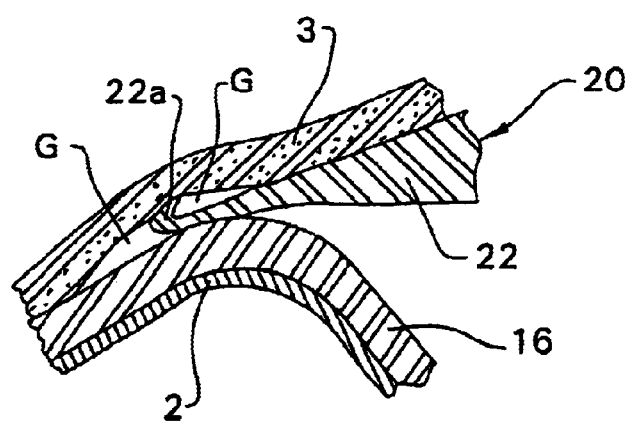
FIG. 4 is a sectional view showing a problem which arises at the portion taken along the line IV—IV in FIG. 3.

A weather strip 10 for a sliding type rear door is described now with reference to FIGS. 1 and 2 and FIGS. 5 to 7. The weather strip 10 is attached to a front end portion of a rear door 1 of a car. The car is unfurnished with a center pillar. The front door 2 of the car is turnable about hinges provided at the front end thereof, and the rear door 1 of the car slides back and forth.

The weather strip 10 includes a tapered lip portion 12 which extends towards the front door 2. The tapered lip portion 12 is formed on a molded portion 11 of the weather strip 10 formed at the upper end thereof. The tapered portion 12 elastically contacts an opening seal 3 attached to a roof side 4 of a car body and a weather strip 16 attached to a rear end of the front door 2 when the rear door 1 is closed. A water receiver 13 is provided immediately below the lip portion 12.

A guide portion 14 is formed on the weather strip 10 at about a lower half of the lip portion 12 toward the water receiver 13. The guide portion 14 is thicker than the lip portion 12. The guide portion 14 has a length and a thickness which is set such that it can contact the opening seal 3 and the front door weather strip 16 immediately before a tip end 12a of the lip portion 12 contacts the opening seal 3 and the front door weather strip 16, when the rear door 1 is closed in a state where the front door 2 is closed in advance.

That is, the guide portion 14 comprises a tapered base portion 14a and an expansion portion 14b which is provided at the front end of the base portion 14a. The expansion portion 14b has a semicircular shape in cross section and expands toward the front door weather strip 16. The expansion portion 14b contacts with the opening seal 3 and the front door weather strip 16 immediately before the tip end 12a of the lip portion 12 contacts the opening seal 3 and the front door weather strip 16, when the rear door 1 is closed after the front door 2 is closed.

Figure 5:
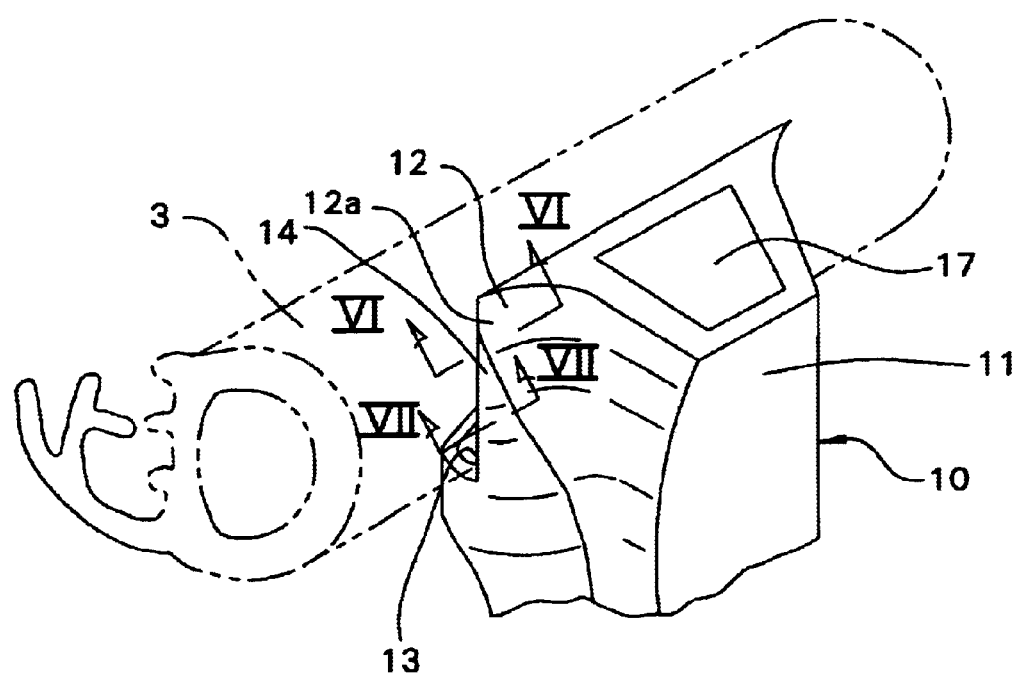
FIG. 5 is a perspective view of a weather strip for a sliding type rear door of the invention.

Since the guide portion 14 is formed at about a lower half of the lip portion 12, the height of the tip end 12a of the lip portion 12 is substantially half of the tip end 22a of the conventional lip portion 22. Depicted 17 in FIG. 5 is a central core extraction hole which is needed when the weather strip 10 is molded. The hole is utilized as a drainage port after it is attached to the rear door 1. Water caught by the water receiver 13 passes through the water drawing port 18 and is guided towards the drainage port 17, and is discharged downward through the hollow portion of the extrusion molded portion 15.

Figure 7:
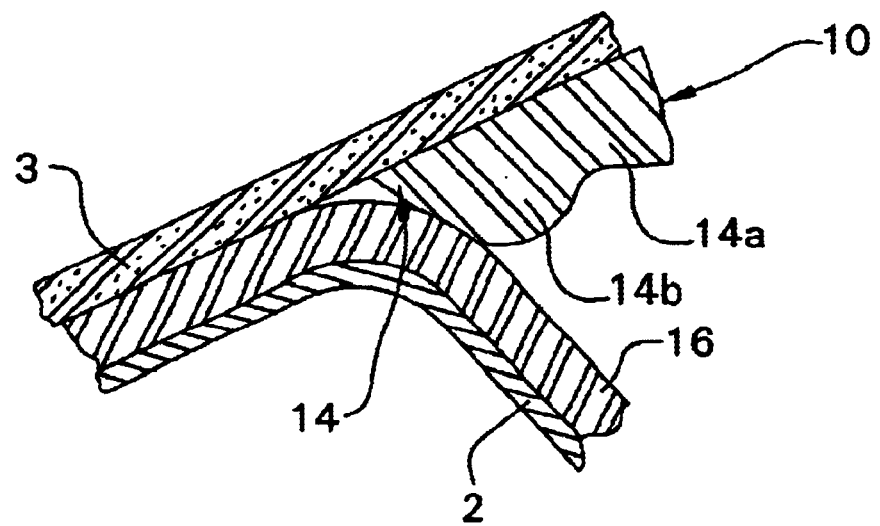
FIG. 7 is a sectional view taken along the line VII—VII in FIG. 5.

When the rear door 1 comprised with the weather strip 10 for the sliding type rear door is closed by sliding in a forward direction while the front door 2 is closed, the guide portion 14 contacts the opening seal 3 and the front door weather strip 16 immediately before the tip end 12a of the lip portion 12 contacts them (see FIG. 7).

As a result, the guide portion 14 slightly widens or expands the interval between the opening seal 3 and the front door weather strip 16 so that the tip end 12a of the lip portion 12 can easily enter the interval therebetween. Further, since the expansion portion 14b is formed semicircular in cross section, it can expand the interval between the opening seal 3 and the front door weather strip 16 with low resistance.

Figure 6:
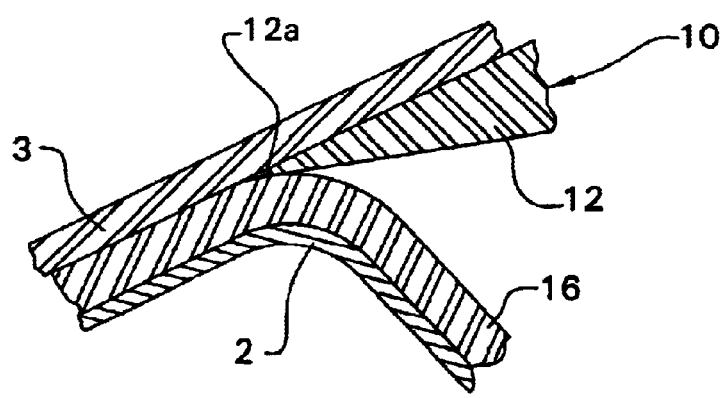
FIG. 6 is a sectional view taken along the line VI—VI in FIG. 5.

Accordingly, it is possible to prevent the tip end 12a of the lip portion 12 from sliding hard on the surfaces of the opening seal 3 and the front door weather strip 16, so that the tip end 12a of the lip portion 12 does not reverse nor curl up (see FIG. 6). As a result, the opening seal 3, the front door weather strip 16 and the weather strip 10 can make an intimate contact with one another, so that a sealing performance therebetween can be kept excellently.

Further, since the guide portion 14 is formed at substantially the lower half of the lip portion 12, a rigidity of the lip portion 12 can be enhanced. This is also effective in preventing the tip end 12a of the lip portion 12 from being reversed or curled up.

According to the weather strip 10 for a sliding type rear door of the present invention, the guide portion 14 is provided at about the lower half of the lip portion 12, which is formed thicker than the lip portion 12 and which contacts both the opening seal 3 and front door weather strip 16 immediately before the tip end 12a of the lip portion 12 contacts them when the rear door 1 is closed. Therefore, the tip end 12a of the lip portion 12 can be prevented from being reversed or curled up. As a result, the sealing performance between the opening seal 3, the front door weather strip 16 and the weather strip 10 improves.

Further, since the thick guide portion 14 is provided at the lip portion 12, a rigidity of the lip portion 12 can be enhanced. This is also effective in preventing the tip end 12a of the lip portion 12 from being reversed or curled up, so that the sealing performance further improves.

The disclosure of Japanese Patent Application No. 2002-075700 including specification, claims, and drawings, is incorporated herein by reference.

What is claimed is:

1. A weather strip for a sliding rear door of a car excluding a center pillar, while including a front door pivotable about hinges provided at a front end thereof and the sliding rear door capable of sliding back and forth, said weather strip is attached to a front end of the rear door, said weather strip includes a tapered lip portion extending toward the front door, said tapered lip portion is formed on a molded portion of the weather strip located at an upper front end thereof, said tapered lip portion elastically contacts an opening seal attached to a roof side of a car body and a front door weather strip attached to a rear end of the front door when the rear door is closed, wherein a guide portion is provided at a lower part of the tapered lip portion, said guide portion is thicker than an upper part of the tapered lip portion, said guide portion contacts the opening seal and the front door weather strip immediately before a tip end of the tapered lip portion contacts the opening seal and the front door weather strip when the rear door is closed while the front door is closed.

2. The weather strip for a sliding rear door according to claim 1, wherein the guide portion comprises a tapered base portion and an expansion portion provided at a front end of the base portion, said expansion portion comprising a semicircular shape in cross section, said expansion portion bulging toward the front door weather strip.

3. The weather strip for a sliding rear door according to claim 1, wherein the opening seal comprises a single rounded seal element attached to the roof side of the car body and extending along a length thereof.

4. A combination of:
a car body having a front door opening, a rear door opening and a roof positioned above the front and the rear door openings;
a front door positioned within the front door opening and having a front end with hinges secured to the car body for pivoting movement;
a sliding rear door located adjacent the front door and positioned in the rear door opening of the car body;
a roof weather strip comprising a roof seal extending along a length of the car body above the front and rear door openings;
a front door weather strip extending along a rear end edge of the front door and projecting toward the second door;
a rear door weather strip comprising a tapered lip portion projecting toward the front door along a length of a front end edge of the sliding rear door, said tapered lip portion including an upper tapered portion contacting the roof weather strip at a top portion thereof and a guide portion spaced therebelow and having a greater thickness forming an expansion portion, the guide portion contacting a portion of the roof weather strip and the front door weather strip, and the expansion portion contacting the door weather strip spaced from a tip end of the guide portion.

5. The combination of claim 4, wherein the tapered lip portion projects outwardly toward the front door weather strip approximately the same distance along the entire length thereof.

6. The combination of claim 4, wherein the expansion portion has a semicircular shape projecting toward the front door weather strip.

7. The combination of claim 4, wherein the tapered lip portion coacts with the roof weather strip and the front door weather strip to provide a seal and so that an upper top outward edge of the upper tapered portion of the tapered lip portion does not fold when the front door and then the sliding rear door are closed.

* * * * *